(12) United States Patent
Wang et al.

(10) Patent No.: US 7,815,869 B2
(45) Date of Patent: Oct. 19, 2010

(54) CATALYTIC CONVERTER WITH MID-BED SENSOR

(75) Inventors: Hui Wang, Ann Arbor, MI (US); Niladri Das, Canton, MI (US); Haimian Cai, Ann Arbor, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 952 days.

(21) Appl. No.: 11/635,696

(22) Filed: Dec. 7, 2006

(65) Prior Publication Data

US 2008/0138257 A1      Jun. 12, 2008

(51) Int. Cl.
*F01N 3/28* (2006.01)
(52) U.S. Cl. .......................... 422/171; 422/179; 29/890
(58) Field of Classification Search ........................ None
See application file for complete search history.

(56) References Cited

U.S. PATENT DOCUMENTS 4,278,639 A * 7/1981 Tadokoro et al. ............ 422/171
4,347,219 A    8/1982 Noritake et al.
6,299,843 B1  10/2001 Locker et al.
7,452,512 B2 * 11/2008 Quackenbush .............. 422/171

FOREIGN PATENT DOCUMENTS

DE         3626728 A1 *  2/1988

* cited by examiner

*Primary Examiner*—Jennifer A Leung
(74) *Attorney, Agent, or Firm*—Frank L. Lollo; MacMillan, Sobanski & Todd, LLC

(57) ABSTRACT

A catalytic converter assembly is provided that includes a metallic tubular member having a first end and a second end. A first substrate is disposed within the metallic tubular. A second substrate is disposed within the metallic tubular member. A spacer is axially positioned the between the first and second substrate that includes a cylindrical body with a first wall and a second wall formed substantially perpendicular to the cylindrical body. The first wall abuts an end of the first substrate for retaining the first substrate between the first end and the first wall for preventing movement. The second wall abuts an end of the second substrate for retaining the second substrate between the second end and the second wall for preventing movement.

14 Claims, 4 Drawing Sheets

CATALYTIC CONVERTER WITH MID-BED SENSOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to catalytic converters, and more specifically, to catalytic converters with mid-bed sensor and short inlet and outlet substrates.

2. Background of Related Art

Catalytic converters include one or more catalytic elements housed in a metallic housing. The housing includes a first end and a second end. Each end portion may be conical-shaped. The catalytic converters are typically manufactured by cutting a metallic tubular member to a desired length. A respective support element is disposed around a respective substrate and thereafter inserted within the housing. The housing is formed to a targeted dimension for securing the substrates therein. One or more respective substrates may be utilized within a respective catalytic converter. Substrates are typically secured by some means to prevent movement of the substrate within the housing such as press forming the housing and support member against the outer surface of the substrate. Two substrates utilized in a catalytic converter disposed juxtaposed to one another are less susceptible to movement or tilting after the substrates are secured within the housing by deforming the housing radially inward. However, in certain instances, the substrates are required to be spaced from each other and may be subject to movement or tilting even though the housing and support member has been secured against the substrate.

One example is when a sensor is utilized. Sensors are commonly coupled to the housing for sensing gas concentrations passing through the substrates. The sensor is inserted through the wall of the housing and extends into the interior air space. The aperture for receiving the housing is typically disposed equidistant between the ends of the housing so that the sensor is positioned between the substrates.

Moreover, design constraints may dictate that the length of the converter is shorter than what is desired. Under such conditions, the axial length of the both substrates may be shortened to accommodate the shorter design packaging. The substrates will have a greater tendency to move and tilt as the axial length of each respective substrate gets substantially equal to or less than diameter of each respective substrate. The securing of the housing and support member against the substrates may not prevent movement or tilting of the respective substrates under such conditions. Therefore, there is a need to further secure the substrates when the substrates are spaced from one another in a catalytic converter assembly.

BRIEF SUMMARY OF THE INVENTION

The present invention has an advantage of utilizing a spacer that includes radial extending wall portions that abut the substrates in a catalytic converter. The wall portions provide an abutment surface against respective faces of the substrates to prevent movement or tilting of the substrate. The spacer may further include a plurality of apertures formed in the cylindrical body of the spacer if a sensor is utilized. The plurality of apertures provide for ease of assembly when an aperture in the housing of the catalytic converter is aligned with any one of the plurality of apertures of the spacer.

In one aspect of the present invention, a catalytic converter assembly is provided that includes a metallic tubular member having a first end and a second end. A first substrate is disposed within the metallic tubular member. A second substrate is disposed within the metallic tubular member. A spacer is axially positioned between the first substrate and the second substrate. The spacer has a cylindrical body with a first wall formed substantially perpendicular to the cylindrical body. The spacer further includes a second wall formed substantially perpendicular to the cylindrical body. The first wall abuts an end of the first substrate for retaining the first substrate between the first end and the first wall for preventing movement of the first substrate. The second wall abuts an end of the second substrate for retaining the second substrate between the second end and the second wall for preventing movement of the second substrate.

In yet another aspect of the present invention, a method is provided for forming a catalytic converter assembly having a first substrate and a second substrate. A metallic tubular member is provided having a first end and a second end. The metallic tubular member has an aperture formed centrally between the first end and the second end. A spacer is inserted within the metallic tubular member. The spacer has a cylindrical body with at least one aperture formed about the cylindrical body. The spacer further includes a first wall and a second wall formed substantially perpendicular to the cylindrical body. The first wall abuts an end of the first substrate for retaining the first substrate between the first end of the metallic tubular member and the first wall to prevent movement of the first substrate. The second wall abuts an end of the second substrate for retaining the second substrate between the second end of the metallic tubular member and the second wall to prevent movement of the second substrate. The aperture of the metallic tubular member is aligned with the at least one aperture of the spacer. A sensor boss is inserted through the aperture of the metallic tubular member aligned with the at least one aperture of the spacer. The first substrate is inserted through within the first end of the metallic tubular member. The second substrate is inserted within the second end of the metallic tubular member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
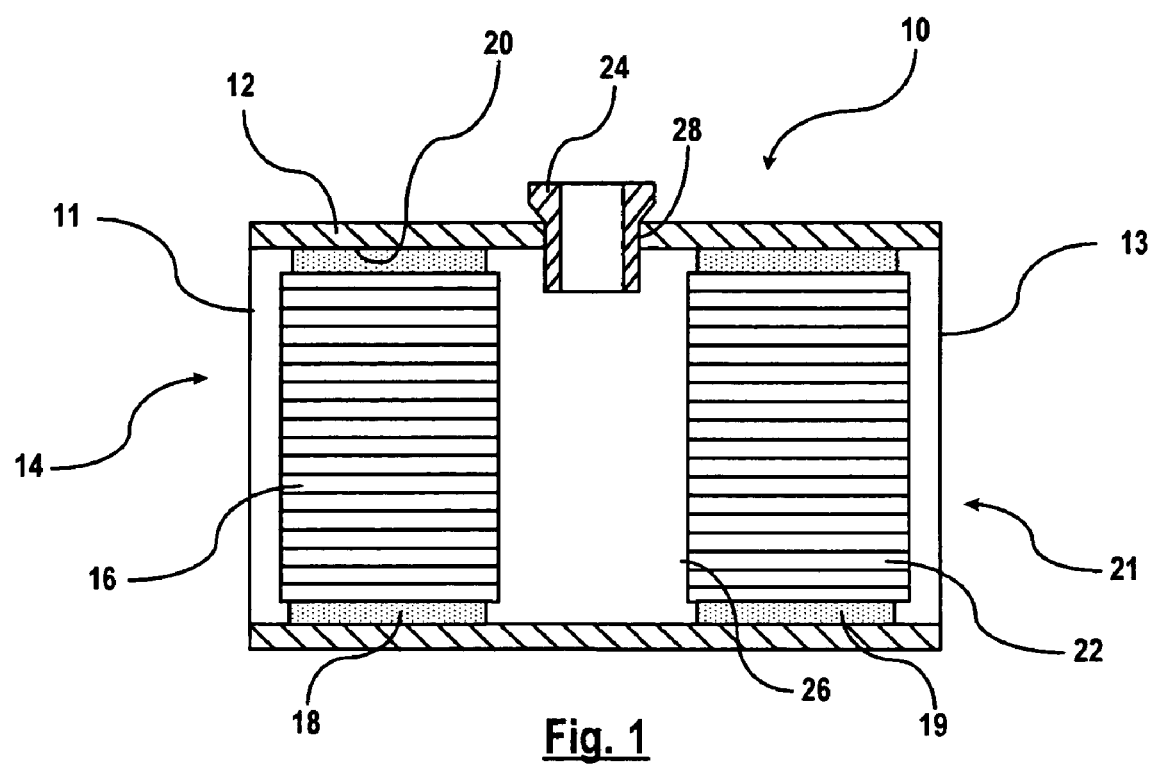
FIG. 1 is a cross section view of a prior art catalytic converter assembly.

Referring now to the drawings, there is illustrated in FIG. 1, a cross section view of a catalytic converter assembly 10. The catalytic converter assembly 10 includes a housing 12 formed from a corrosion resistant alloy such as a stainless steel alloy having a first end 11 and a second end 13. The first end 11 and the second end 13 may include tapered or conical-shaped ends (not shown).

A first catalytic element 14 comprises a first substrate 16 and a first support member 18 secured within an interior of the housing 12. An inner surface 20 of the housing 1.2 is pressed against the first catalytic element 14 for securing the first catalytic element 14 therein. Alternatively, the first catalytic element 14 may be stuffed into the housing 12.

The catalytic converter assembly 10 further includes a second catalytic element 21. The second catalytic element 21 comprises a second substrate 22 and a second support member 19 secured within an interior of the housing 12. An inner surface 20 of the housing 12 is pressed against the second catalytic element 21 for securing the second catalytic element 21 therein. Alternatively, the second catalytic element 21 may be stuffed into the housing 12.

The catalytic converter assembly 10 may further include a sensor boss 24. The sensor boss 24 is inserted through a housing aperture 28 to the interior of the housing 12. The sensor boss 24 receives a sensor (not shown) for measuring the gas concentrations passing through the substrates. Due to the spacing of the respective substrates, movement or tilting of the respective substrates may occur during operation of the catalytic converter, and more so when a shortened substrate (e.g., axial length substantially equal to or less than the diameter of the substrate) is utilized.

Figure 2:
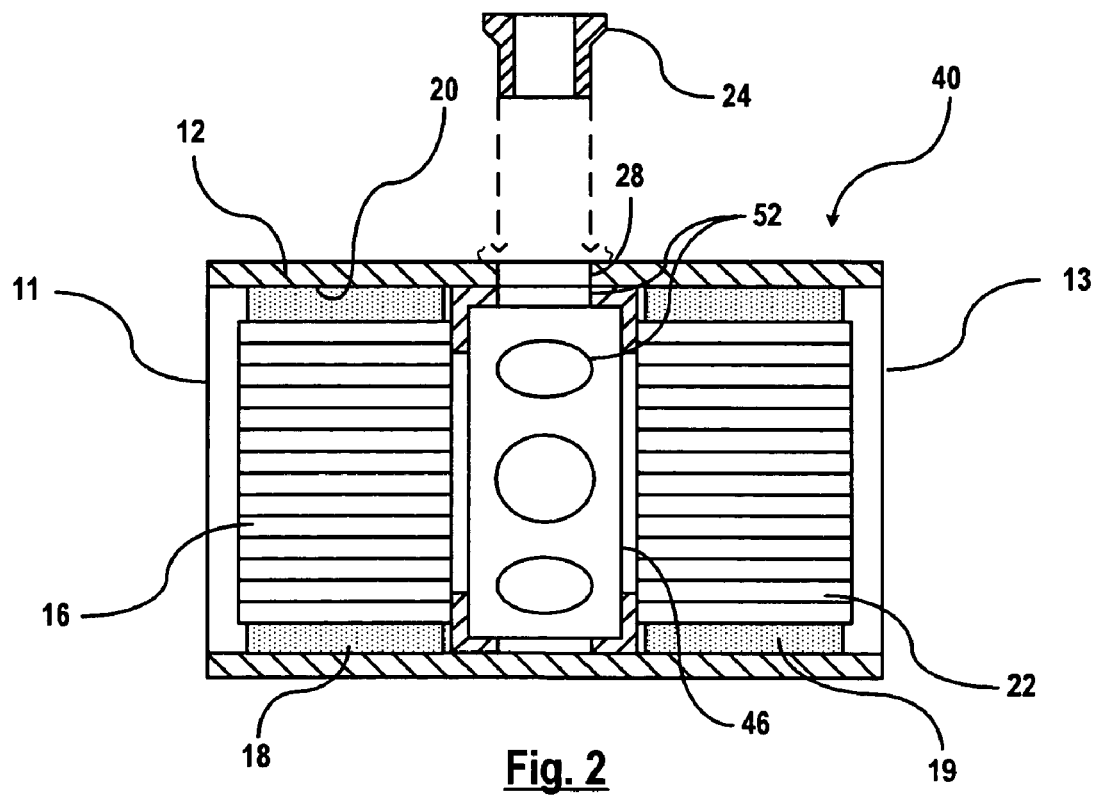
FIG. 2 is a cross section view of a catalytic converter assembly according to a first preferred embodiment.

FIG. 2 illustrates a cross section view of a catalytic converter assembly 40 according to a first preferred embodiment. The catalytic converter assembly 40 includes the first substrate 16 and the second substrate 22. A first support member 18 is disposed between the inner surface 20 of the housing 12 and the first substrate 16. A second support member 19 is disposed between the inner surface 20 of the housing 12 and the second substrate 22. A spacer 46 is disposed between the first substrate 16 and the second substrate 22, in addition to the first support member 18 and the second support member 19.

Figure 3:
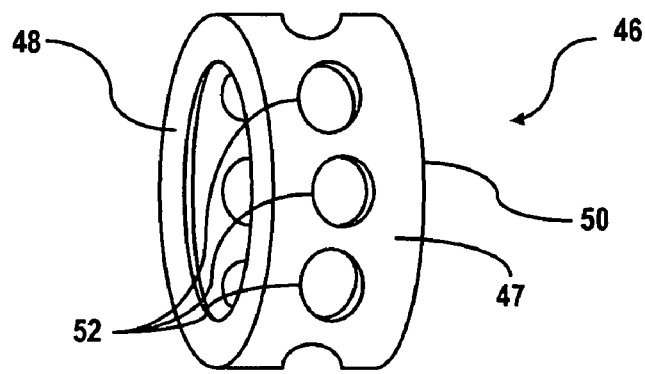
FIG. 3 is a perspective view of the spacer according to the first preferred embodiment.

FIG. 3 illustrates a perspective view of the spacer 46 according to the first preferred embodiment. Referring to both FIGS. 2 and 3, the spacer 46 includes a cylindrical body 47 having a first wall 48 and a second wall 50. The spacer 46 is typically made from a thin-wall cut-off metallic tube such as a stainless steel pipe. The first wall 48 is formed substantially perpendicular to the cylindrical body 47 and extends radially inward from the cylindrical body 47. The first wall 48 has a radial length that is greater than a thickness of the cylindrical body.

The second wall 50 is formed substantially perpendicular to the cylindrical body 47 and extends radially inward from the cylindrical body 47. The second wall 50 has a radial length that is greater than a thickness of the cylindrical body 47.

The first wall 48 and the second wall 50 are flat planar surfaces that abut a portion of a face of the first substrate 16 and a portion of the second substrate 22, respectively. The first wall 48 and the second wall 50 are added due to the difficulties that are present in controlling the spacer size to match the substrates. That is, if a respective spacer were utilized that did not include a first wall 48 and a second wall 50, and if the respective spacer is sized is too large, then the respective substrates may slip into the respective spacer. Alternatively, if the respective spacer were too small, then a thin-walled spacer may cause a very high concentrative stress on the face of the respective substrates and damage the respective substrates, which are typically made of ceramic. If respective spacer is out-of-round, then those portions of the respective spacer that is too large will allow the respective substrates to slip within the respective spacer while other portions of the respective substrate will be blocked by the decreased spacer diameter as a result of the out-of-roundness profile. By utilizing the spacer 46 having the first wall 48 and the second wall 50, the areas of the first substrate 16 and the second substrate 22 contacting the first wall 48 and the second wall 50 are dispersed over a larger area than those very high concentrated areas of contact discussed above. As a result, the first substrate 16 and the second substrate 22 are less susceptible to damage resulting from spacer 46 vibrating against the first substrate 16 and second substrate 22 as a result of operational vibration since the spacer 46 secures the first substrate 16 and the second substrate against the first end 11 and the second end 13, which prevents movement or tilting.

As shown in FIG. 3, a plurality of apertures 52 is formed about the cylindrical body 47 of the spacer 46. The plurality of apertures 52 allows the spacer 46 to be inserted within the housing 12 without having to maintain radial alignment with the aperture 28 of the housing 12 during assembly. As the spacer 46 is inserted within the housing 12, at least one of the plurality of apertures 52 will be partially aligned with the aperture 28 of the housing 12. That is, after assembly of the spacer 46, a portion of one of the plurality of apertures 52 will be visible through the aperture 28 of the housing 12 such that the spacer 46 can be slightly rotated so that full alignment between the respective apertures may be attained.

Figures 4, 5:
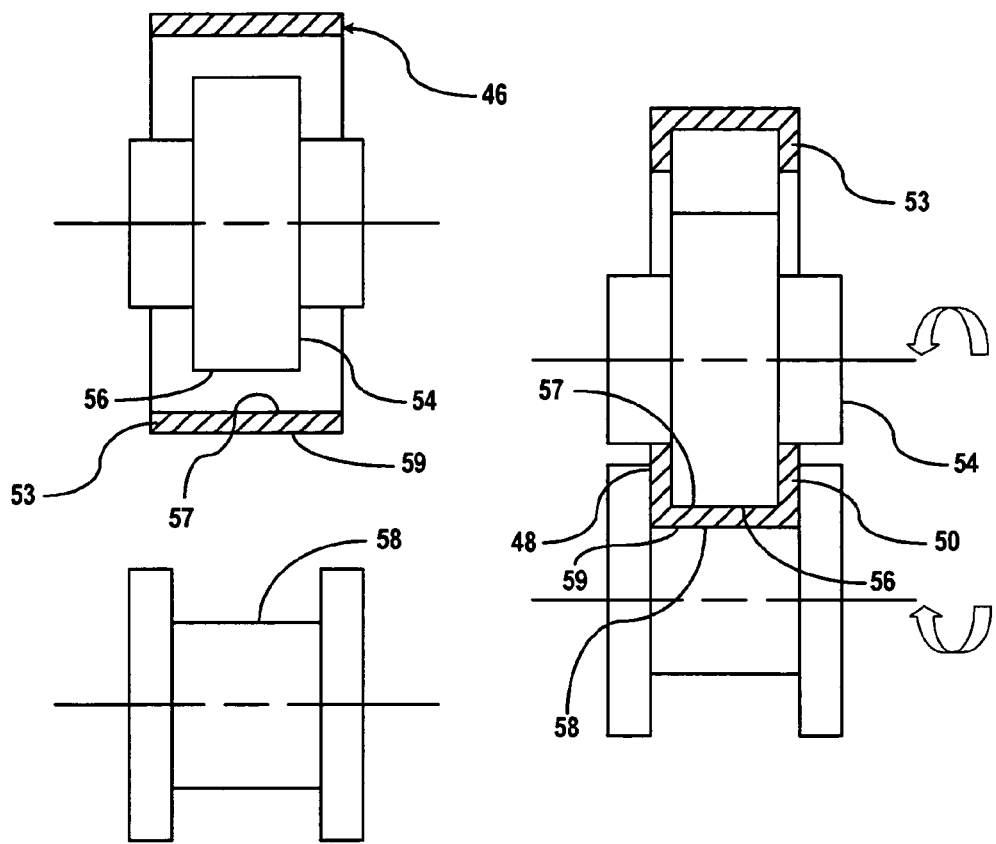
FIG. 4 is a forming tool used to form the spacer according to the first preferred embodiment.
FIG. 5 is the forming tool used to form the spacer according to the first preferred embodiment.

FIGS. 4 and 5 illustrate the formation of the spacer 46 according to the first preferred embodiment. A thin-wall cut-metal tubular member 53 is placed into a roll forming tool 54. A first forming member 56 is inserted through the interior region of the tubular member 53. The first forming member 56 is brought into contact with an inner surface 57 of the tubular member 53. A second roll forming member 58 is brought into contact with an outer surface 59 of the tubular member 53. Both the first forming member 56 and the second forming member 58 are rotated. As the second roll forming member 58 is urged against the outer surface 59 of the tubular member 53, each end of the tubular member 53 are shaped for forming the first wall 48 and the second wall 50 between the first roll forming member 56 and second roll forming member 58 in a direction that is substantially perpendicular to the cylindrical body 47 of the spacer 46. The first wall 48 and the second wall 50 extend radially inward from the cylindrical body 47.

Figure 6:
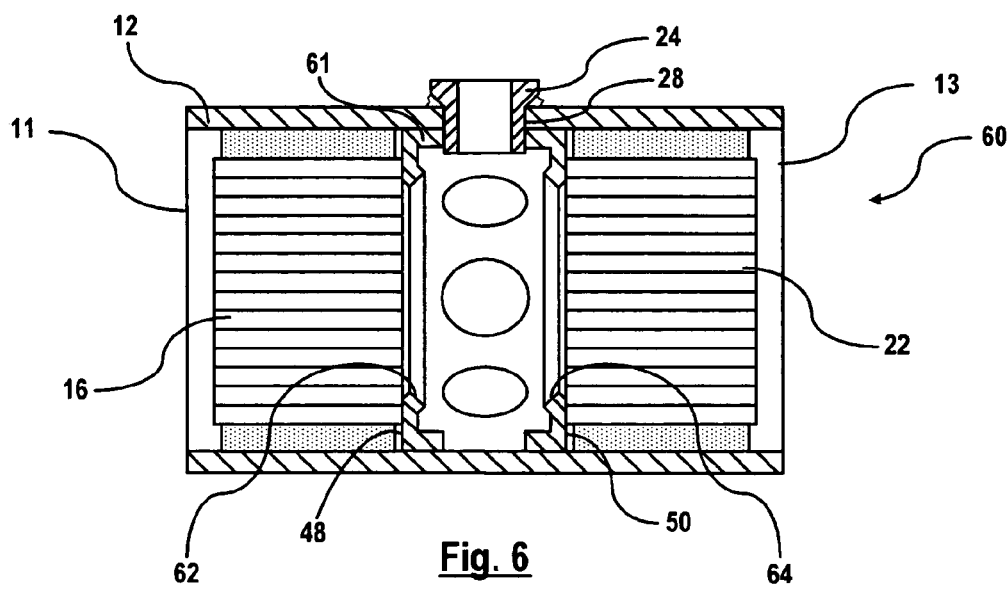
FIG. 6 is a cross section view of a catalytic converter assembly according to a second preferred embodiment.

FIG. 6 illustrates a cross section view of a catalytic converter assembly 60 according to a second preferred embodiment. The spacer 61 is similar to the spacer 46 shown in FIGS. 2 and 3 with the addition of curled ends. The first wall 48 includes an inner race end portion 62 that is curled axially inward. The second wall 50 includes an inner race end portion 64 that is curled axially inward. Since the spacer 61 is formed from a cut-off metal tube, the end portions may have sharp edges or burrs which can protrude into the respective substrates. Curling the respective end portions 62 and 64 axially inward away from their respective adjacent substrates prevent damage that may be the result of a sharp edge projecting into a respective face of each substrate.

Figure 7:
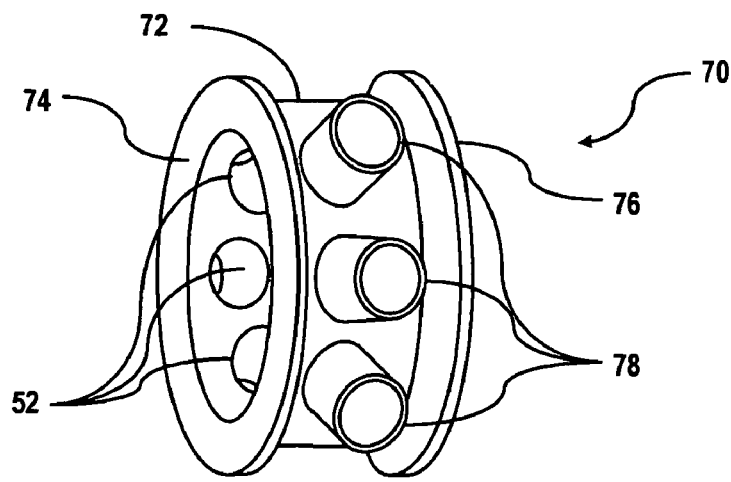
FIG. 7 is a perspective view of a spacer according to a third preferred embodiment.

FIG. 7 illustrates a perspective view of the spacer 70 according to a third preferred embodiment. The spacer 70 includes the cylindrical body 72 having a first wall 74 and a second wall 76. The first wall 74 and the second wall 76 are formed such that the respective flanges extend radially outward in comparison to the flanges of the respective spacer shown in FIG. 3. In addition, the plurality of apertures 52 are coupled to a plurality of projecting tubular bosses 78 for creating guided supports. Preferably, the plurality of projecting tubular bosses 78 is coupled to the plurality cylindrical body 72 of the spacer 70 such that each respective aperture is axially aligned with a respective projecting tubular boss.

Figure 8:
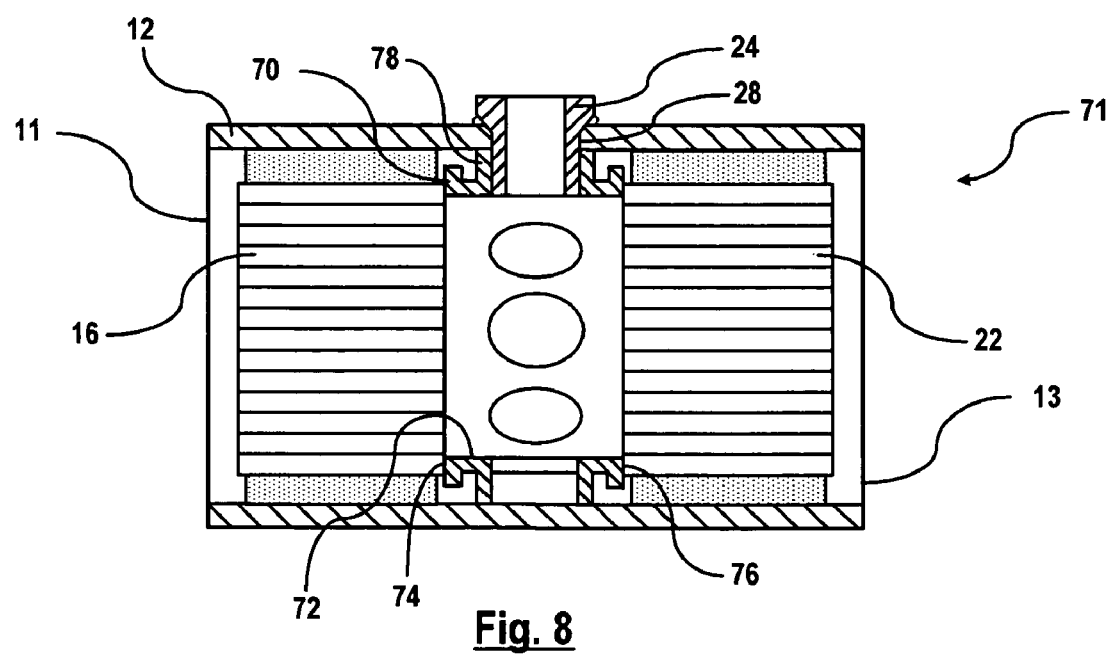
FIG. 8 is a cross section view of a catalytic converter assembly according to a third preferred embodiment.

FIG. 8 illustrates a cross section view of a catalytic converter assembly 71 according to the third preferred embodiment. The spacer 70 is disposed between the first substrate 16 and the second substrate 22. The spacer 70 has an inner surface diameter 72 that is smaller than the diameter of the spacer 46 shown in FIGS. 2 and 3 which allows space for the first wall 74 and the second wall 76, in addition to the plurality of projecting tubular bosses 78 to extend in a direction toward the inner surface of the housing 12. The sensor boss 24 is received within the plurality of projecting tubular bosses 78 extend radially outward within the housing 12. As the spacer 70 is inserted within the housing 12, at least one of the plurality of projecting tubular bosses 78 will be partially aligned with the aperture 28 of the housing 12. The respective projecting tubular boss partially aligned, if not fully aligned, will be visible through the aperture 28 of the housing 12 such that the spacer 70 can be slightly rotated so that full alignment between the respective aperture and the respective projecting tubular boss may be attained.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A catalytic converter assembly comprising:
   a metallic tubular member having a first end and a second end;
   a first substrate disposed within the metallic tubular member;
   a second substrate disposed within the metallic tubular member; and
   a spacer axially positioned between the first substrate and the second substrate, the spacer having a cylindrical body with a first wall formed substantially perpendicular to the cylindrical body, the spacer further having a second wall formed substantially perpendicular to the cylindrical body, the first wall abutting an end of the first substrate for retaining the first substrate between the first end and the first wall for preventing movement of the first substrate, the second wall abutting an end of the second substrate for retaining the second substrate between the second end and the second wall for preventing movement of the second substrate, and at least one of the first wall and second wall extending radially outward from the cylindrical body;
   wherein the metallic tubular member includes an aperture centrally formed between the first end and the second end adapted to receive a sensor boss, wherein the spacer further includes a plurality of apertures formed annularly around the spacer, the aperture of the metallic tubular member being aligned with any one of the plurality of apertures during manufacture for receiving the sensor boss there through.

2. The catalytic converter assembly of claim 1 wherein the first wall extends radially outward from the cylindrical body.

3. The catalytic converter assembly of claim 1 wherein the second wall extends radially outward from the cylindrical body.

4. The catalytic converter assembly of claim 1 wherein the first wall includes a radial length that is greater than a thickness of the cylindrical body.

5. The catalytic converter assembly of claim 1 wherein the second wall includes a radial length that is greater than a thickness of the cylindrical body.

6. The catalytic converter assembly of claim 1 wherein the first end and the second end are conical-shaped.

7. A method of forming a catalytic converter assembly having a first substrate and a second substrate, the method comprising the steps of:
   providing a metallic tubular member having a first end and a second end, the metallic tubular member having an aperture formed centrally between the first end and the second end;
   inserting a spacer within the metallic tubular member, the spacer having a cylindrical body with at least one aperture formed about the cylindrical body, the spacer further including a first wall and a second wall formed substantially perpendicular to the cylindrical body, wherein at least one of the first wall and the second wall extends radially outward from the cylindrical body, wherein the first wall abuts an end of the first substrate for retaining the first substrate between the first end of the metallic tubular member and the first wall to prevent movement of the first substrate, and wherein the second wall abuts an end of the second substrate for retaining the second substrate between the second end of the metallic tubular member and the second wall to prevent movement of the second substrate;
   aligning the aperture of the metallic tubular member with the at least one aperture of the spacer;
   inserting a sensor boss through the aligned aperture of the metallic tubular member and the at least one aperture of the spacer;
   inserting the first substrate within the first end of the metallic tubular member; and
   inserting the second substrate within the second end of the metallic tubular member.

8. The method of claim 7 wherein the first substrate is assembled within the metallic tubular member prior to the assembly of the spacer within the metallic tubular member.

9. The method of claim 7 wherein the spacer is assembled within the metallic tubular member prior to the assembly of the first substrate and the second substrate.

10. The catalytic converter assembly of claim 1 further comprising:
    a projecting tubular boss coupled to a respective one of the plurality of apertures such that the respective one of the plurality of apertures is axially aligned with the coupled projecting tubular boss.

11. A catalytic converter assembly comprising:
    a metallic tubular member having a first end and a second end;

a first substrate disposed within the metallic tubular member;

a second substrate disposed within the metallic tubular member;

a spacer axially positioned between the first substrate and the second substrate, the spacer having a cylindrical body with a first wall formed substantially perpendicular to the cylindrical body, the spacer further having a second wall formed substantially perpendicular to the cylindrical body, the first wall abutting an end of the first substrate for retaining the first substrate between the first end and the first wall for preventing movement of the first substrate, the second wall abutting an end of the second substrate for retaining the second substrate between the second end and the second wall for preventing movement of the second substrate; and a projecting tubular boss coupled to each respective one of the plurality of apertures such that the respective one of the plurality of apertures is axially aligned with the respective coupled projecting tubular boss;

wherein the metallic tubular member includes an aperture centrally formed between the first end and the second end adapted to receive a sensor boss, wherein the spacer further includes a plurality of apertures formed annularly around the spacer, the aperture of the metallic tubular member being aligned with any one of the plurality of apertures during manufacture for receiving the sensor boss therethrough.

12. The method of claim 7, wherein the at least one aperture comprises a plurality of apertures.

13. The method of claim 12, wherein aligning the aperture of the metallic tubular member with the at least one aperture of the spacer comprises:

rotating the spacer such that one of the plurality of apertures of the spacer is aligned with the aperture of the metallic tubular member.

14. The method of claim 7, wherein the at least one aperture of the spacer includes a projecting tubular boss that is axially aligned with the at least one aperture, wherein the respective projecting tubular boss guides the sensor boss as it is inserted through the at least one aperture.

* * * * *